(12) United States Patent
Harrison

(10) Patent No.: US 9,132,784 B2
(45) Date of Patent: Sep. 15, 2015

(54) TRUCK HEADACHE RACK

(71) Applicant: Craig Harrison, Gulf Breeze, FL (US)

(72) Inventor: Craig Harrison, Gulf Breeze, FL (US)

(73) Assignee: Daws Manufacturing Company, Inc., Pensacola, FL (US)

( * ) Notice: Subject to any disclaimer, the term of this patent is extended or adjusted under 35 U.S.C. 154(b) by 0 days.

(21) Appl. No.: 14/153,343

(22) Filed: Jan. 13, 2014

(65) Prior Publication Data
US 2015/0197202 A1 Jul. 16, 2015

(51) Int. Cl.
B60R 9/06 (2006.01)
B62D 33/02 (2006.01)
B60R 21/02 (2006.01)
B60R 21/00 (2006.01)

(52) U.S. Cl.
CPC . *B60R 9/06* (2013.01); *B60R 21/02* (2013.01); *B62D 33/02* (2013.01); *B60R 2021/0083* (2013.01)

(58) Field of Classification Search
CPC ............... B60P 7/15; B60R 9/00; B60R 5/04; B60R 7/08; B60R 2021/0083
USPC .................... 296/3, 7, 26.04, 26.05; 280/756; 224/405, 500, 551, 403, 501, 552
See application file for complete search history.

(56) References Cited

U.S. PATENT DOCUMENTS

| 6,983,968 | B2 | 1/2006 | Brauer et al. | |
| 7,121,585 | B2* | 10/2006 | Cole | 280/748 |
| 2011/0108590 | A1* | 5/2011 | Kennedy et al. | 224/402 |

* cited by examiner

*Primary Examiner* — Joseph D Pape
*Assistant Examiner* — Dana Ivey
(74) *Attorney, Agent, or Firm* — GrayRobinson, PA

(57) ABSTRACT

A headache rack for pickup trucks and similar vehicles is disclosed which comprises a three panel construction including a center panel connected between left and right side panels. Each of the left and right side panels is mounted to an upright side rail coupled to one of the side walls of the truck bed, and to a cross bar extending generally horizontally between the side rails. Adjustment structure is provided to adjust the overall lateral dimension of the three panels in order to accommodate truck beds of different width.

14 Claims, 11 Drawing Sheets

TRUCK HEADACHE RACK

FIELD OF THE INVENTION

This invention relates to a rack system for vehicles, and, more particularly, to a headache rack for pickup trucks which is adjustable to accommodate vehicles having beds of different lateral dimension.

BACKGROUND OF THE INVENTION

Rack systems for mounting ladders, equipment and other loads to the bed of pickup trucks and similar vehicles are well known in the prior art. Most systems of this type generally comprise a framework of four or more upright side rails, two of which are mounted atop or alongside one of the side walls of the truck with the other two located on the opposite side wall. Cross bars are connected between aligning side rails on opposite side walls so that they span the bed of the truck in position to support equipment, materials or other loads in an elevated position above the truck bed.

Headache racks may comprise or form part of rack systems of the type described above. Typically, headache racks include structure located in between the upright side rails of the rack system, and extending to the cross bar, so as to form a barrier in between the cab of the truck and its bed. This protects the occupants of the truck from the load being carried, and enhances the structural integrity of the rack system so that heavier loads may be supported.

A number of pickup trucks are currently available, and the lateral dimension of the beds of such vehicles varies from model-to-model and among the different manufacturers. A common problem with vehicle rack systems generally, and headache racks in particular, is their lack of adjustability in the lateral direction, i.e. in the direction between the side walls of the truck bed. One size does not fit all trucks. While it is possible to fabricate headache racks for truck beds of any given width, that is impractical because retailers do not have the space to inventory or display a large number of different size racks.

SUMMARY OF THE INVENTION

This invention is directed to a headache rack for pickup trucks and similar vehicles which comprises a three panel construction including a center panel connected between left and right side panels. Each of the left and right side panels is mounted to an upright side rail coupled to one of the side walls of the truck bed, and to a cross bar extending generally horizontally between the side rails. Adjustment structure is provided to vary the overall lateral dimension of the three panels in order to accommodate truck beds of different width.

In the presently preferred embodiment, the adjustment structure of this invention may comprise a number of spaced fingers extending from opposite sides of the center panel which are connected by fasteners to adjustment slots formed in respective left and right side panels. The adjustment structure may further comprise one or more adjustment slots formed along each side of the center panel through which a fastener may be extended for connection within a corresponding number of bores formed in a center beam of respective left and right side panels. Still further adjustment structure may comprise one or more adjustment slots formed in a bottom plate of both right and left side panel, each of which receives a fastener connected to a base plate of the center panel.

In addition to its lateral adjustment capability, the headache rack of this invention adds structural rigidity to the connection between the upright side rails and the cross bar, and protects occupants of the vehicle from loads carried on the rack. A space may be provided between the top of the center panel and cross bar of the headache rack which aligns with the rear view minor of the truck for enhanced visibility. Further, a second headache rack may be positioned near the tailgate of the truck bed to add even more rigidity and load-carrying capability to the rack system.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
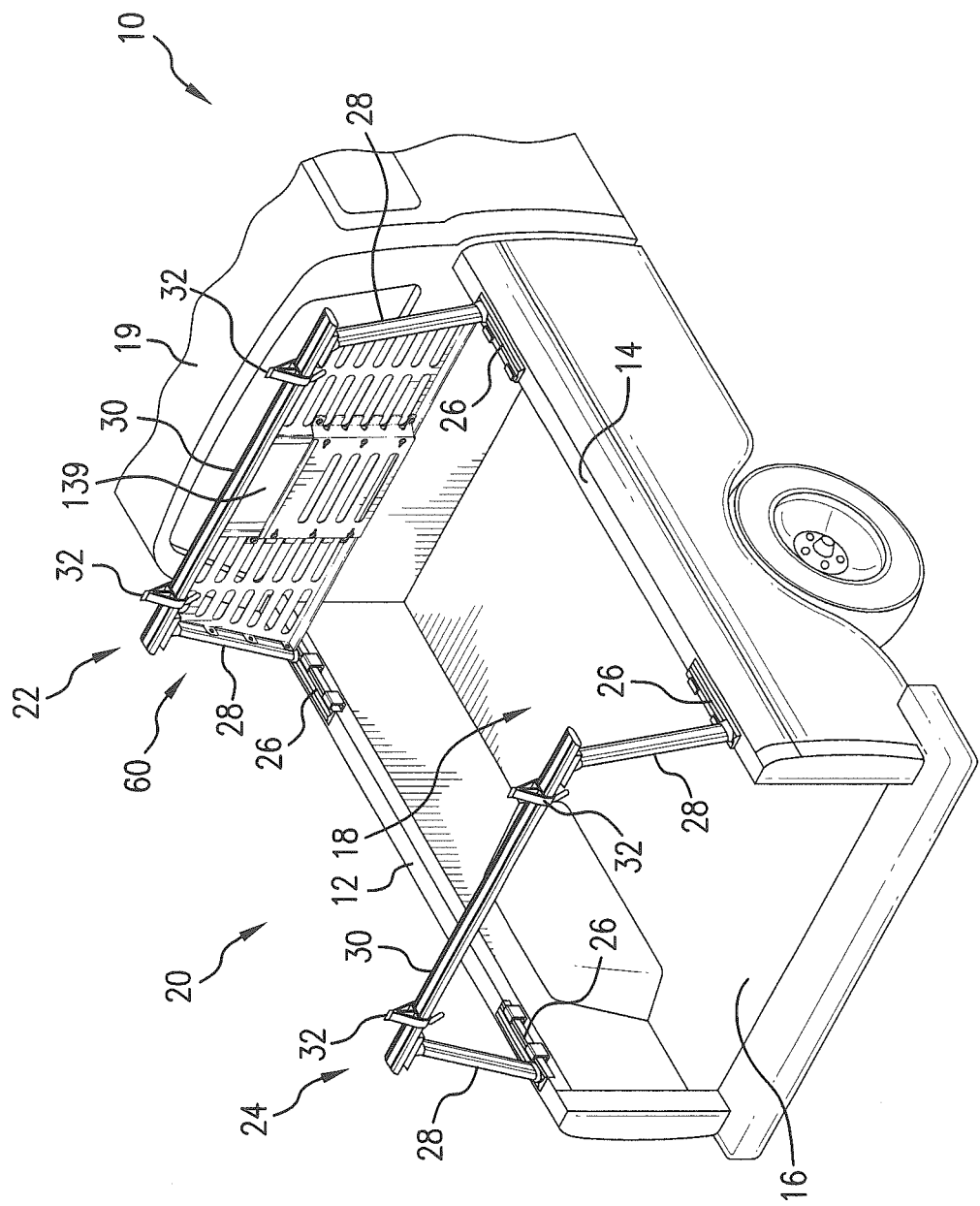
FIG. 1 is a perspective view of a rack system mounted to the bed of a pickup truck which incorporates the adjustable headache rack of this invention.

Referring initially to the FIG. 1, a pickup truck 10 is schematically depicted having a side wall 12, an opposed side wall 14 and a floor 16 between them which collectively define a bed 18 located behind the cab 19. The terms "front" and "forward" when used herein refer to a location proximate the cab 19 of the truck 10, whereas the terms "rear" and "rearward" denote the opposite end of the bed 18. The terms "lateral" and "laterally spaced" refer to a direction between the side walls 12, 14 of the truck bed 18.

A rack system 20 is illustrated in FIG. 1, which may be employed as a ladder rack for supporting elongated tools, equipment and/or materials, having a forward rack structure 22 and a rear rack structure 24. Each rack structure 22, 24 includes a base support 26 located on the side wall 12 of the truck 10, and a second base support 26 located on the opposite side wall 14 in substantial alignment with the first base support 26. Each base support 26 mounts an upright side rail 28, and a cross bar 30 is connected at opposite ends to each side rail 28 so that it extends between the side walls 12, 14 of the truck 10 in position above the bed 18. One or more tie-downs 32 may be mounted to each of the cross bars 30 for securing tools, equipment, materials and other items to the rack system 20.

Figure 2:
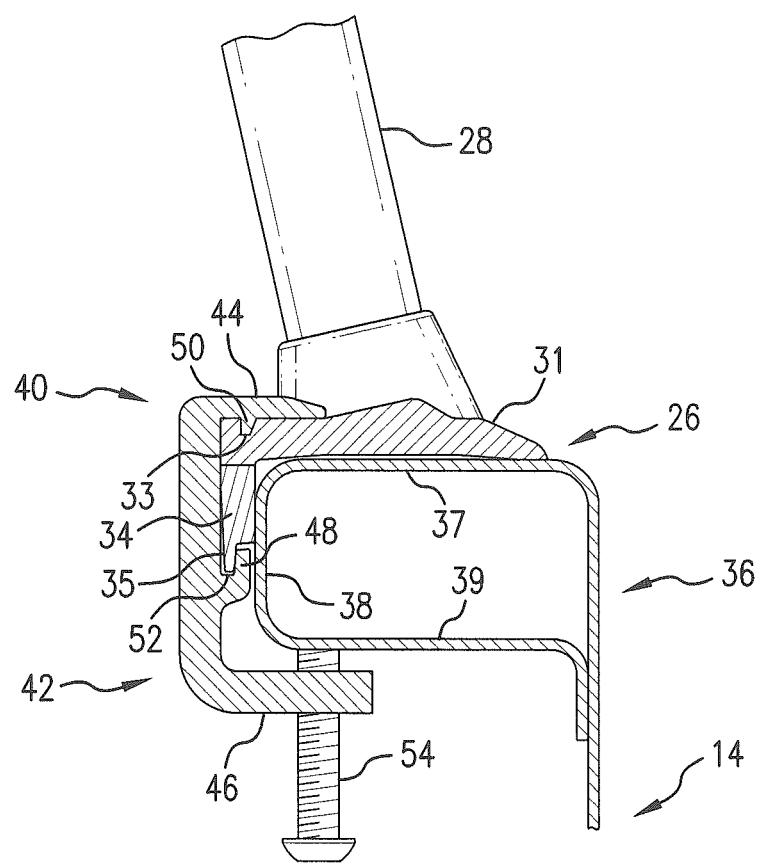
FIG. 2 is a cross sectional view of a clamping device for mounting a base support to a side wall of the pickup truck shown in FIG. 1.

As best seen in FIGS. 1 and 2, each base support 26 is formed in and L-shape including a top plate 31 having a recess 33 extending along its length, and a side plate 34 substantially perpendicular to the top plate 32. The side plate 34 is preferably formed with a downwardly extending lip 35. The upper portion of each side wall 12, 14 of the truck 10 has a channel 36 that extends along the length of the bed 18 in the forward to rearward direction. The channel 36 has and upper wall 37, an inner wall 38 and a lower wall 39. The base support 26 is positioned with respect to the truck bed 18 so that its top plate 32 overlies the upper wall 37 of the channel 36 and its side plate 34 abuts the inner wall 38 of channel 36.

At least one, and preferably two, clamping devices 40 are provided to mount each base support 26 to one of the side walls 12 or 14. Each clamping device 40 includes a clamp body 42 comprising an upper leg 44, a lower leg 46 and an intermediate leg 48 located between the upper and lower legs 44, 46. As shown in FIG. 2, the upper leg 44 has a downwardly extending leading edge 50 that fits into the recess 33 formed in the top plate 32 of base support 26. The intermediate leg 48 of clamping device 40 forms a seat 52 that receives the lip 35 of the side plate 34 of base support 26, such that the base support 26 is essentially captured between the upper and intermediate legs 44, 48. The lower leg 46 of the clamping device 40 extends generally parallel to and spaced from the lower wall 39 of the channel 36. A bolt 54 or other fastener is threaded through a bore formed in the lower leg 46 of clamping device 40 and into engagement with the lower wall 39 of channel 36 to secure the base support 26 to the side wall 12 or 14 of the truck bed 18.

Referring now to FIGS. 1 and 3-9 a headache rack 60 according to this invention is illustrated which comprises the forward rack structure 22, including the opposed base supports 26, the opposed side rails 28 and cross bar 30, and, a laterally adjustable panel construction. The panel construction, in turn, comprises a left side panel 62, a right side panel 64 and a center panel 66 which are laterally adjustable relative to one another to accommodate various truck models and/or makes with different lateral spacing between the side walls 12, 14 of the bed 18. For purposes of the present discussion, the terms "left side," "right side," "top" and "bottom" refer to the orientation of the headache rack 60 as viewed from the rear of the truck bed 18 forwardly toward the cab 19, as shown, for example, in FIG. 3.

Figure 5:
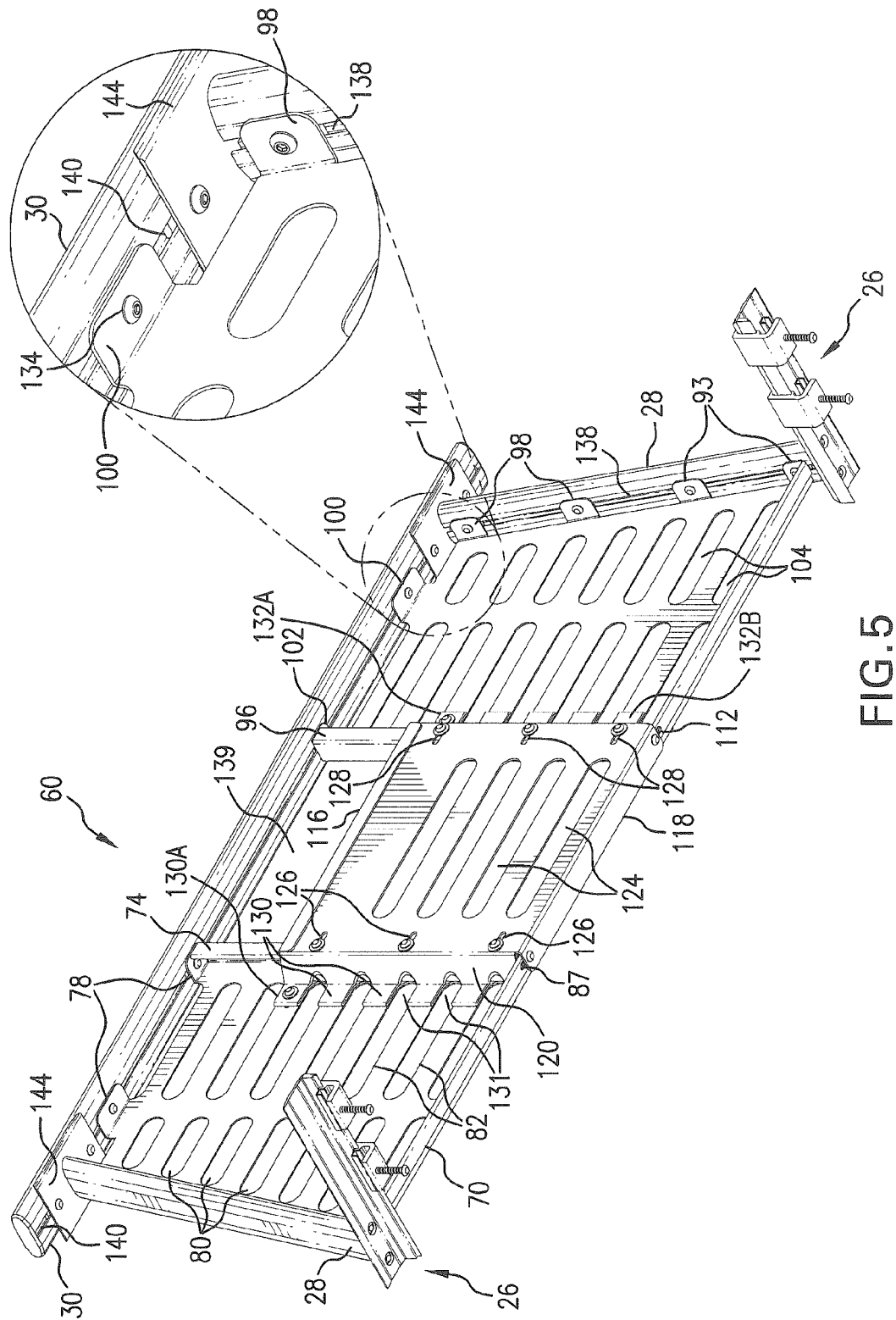
FIG. 5 is a bottom perspective view of the headache rack with an enlargement depicting the connection between the right-side panel and cross bar, and between a side rail and the cross bar.
Figure 6:
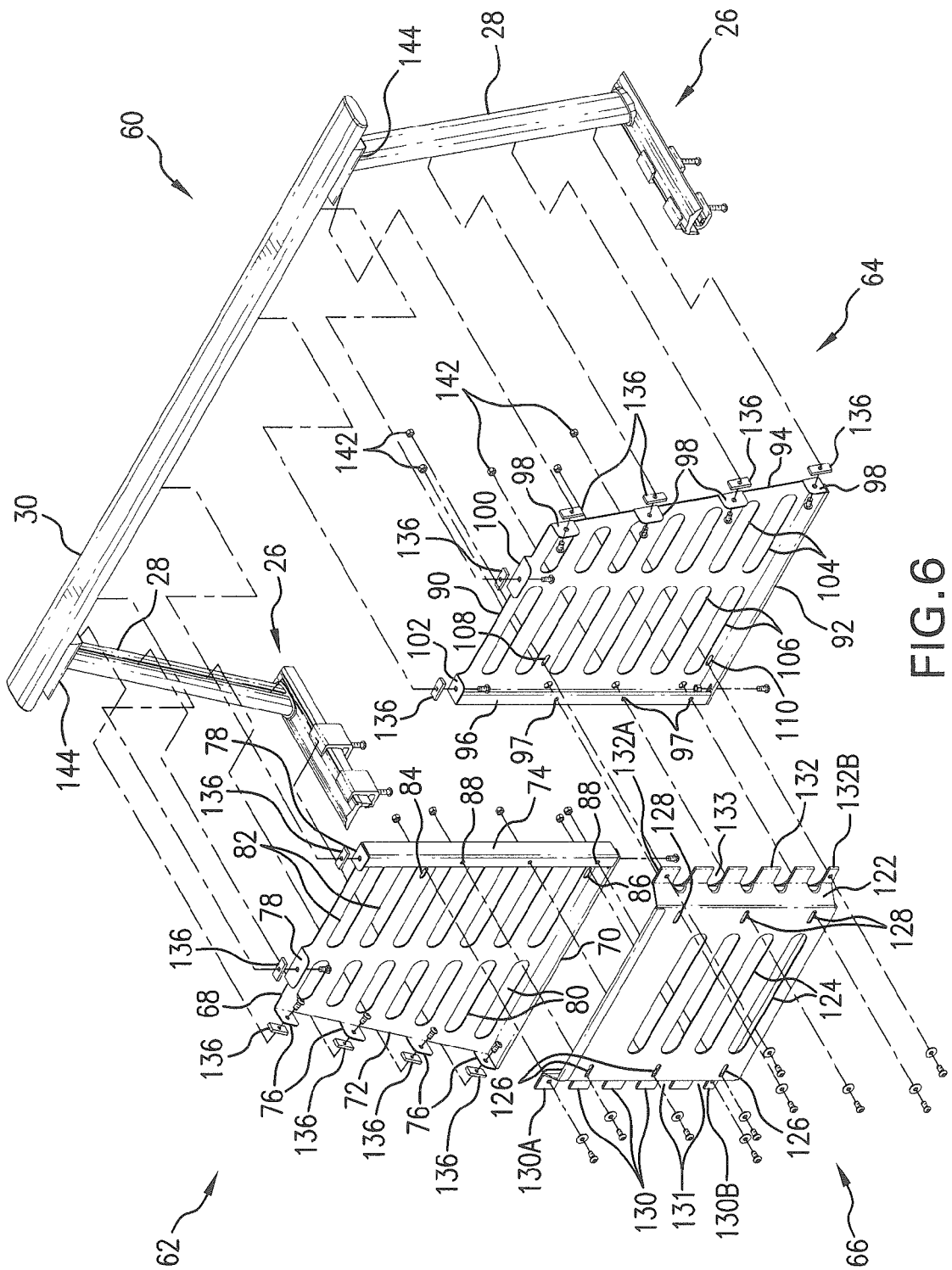
FIG. 6 is an exploded view of the headache rack herein.

As best seen in FIGS. 5 and 6, the left side panel 62 has a top edge 68, a bottom plate 70, an end edge 72 and a center beam 74 extending between the top edge 68 and bottom plate 70. A number of spaced side tabs 76 project from the end edge 72, each formed with a bore and each extending substantially perpendicularly to the left side panel 62. One top tab 78 is mounted to the top edge 68, and a second top tab 78 is mounted to the top of the center beam 74, each of which is oriented perpendicularly to the left side panel 62. In the presently preferred embodiment, the left side panel 62 is formed with two vertically oriented columns of spaced elongated openings, including one column in which openings 80 increase in lateral dimension from the top of left side panel 62 toward the bottom, and a second column of openings 82 having substantially the same lateral dimension. A pair of spaced, left side panel adjustment slots 84 and 86 are formed in the left side panel 62, in between adjacent openings 82, and the bottom plate 70 is formed with a bottom adjustment slot 87. Additionally, the center beam 74 is formed with a number of vertically spaced bores 88.

The right side panel 64 of headache rack 60 has essentially the same construction as the left side panel 62. It includes a top edge 90, a bottom plate 92, an end edge 94 and a center beam 96 extending between the top edge 90 and bottom plate 92. The center beam 96 is formed with a number of vertically spaced bores 97. A number of spaced side tabs 98 project from the end edge 94, each formed with a bore and each extending substantially perpendicularly to the right side panel 64. One top tab 100 is mounted to the top edge 90, and a second top tab 102 is mounted to the top of the center beam 96, each of which are oriented perpendicularly to the right side panel 64. In the presently preferred embodiment, the right side panel 64 is formed with two vertically oriented columns of spaced elongated openings, including one column in which openings 104 increase in lateral dimension from the top of right side panel 64 toward the bottom, and a second column of openings 106 having substantially the same lateral dimension. A pair of spaced, right side panel adjustment slots 108 and 110 are formed in the right side panel 64, in between adjacent openings 106, and the bottom plate 92 is formed with a bottom adjustment slot 112. See FIG. 5.

The center panel 66 of headache rack 60 has a top edge 116, a base plate 118, a left side plate 120 and a right side plate 122 with a number of elongated, vertically spaced openings 124 located between the top edge 116 and base plate 118. A number of left side adjustment slots 126 are formed in the center panel 66 between its left side plate 120 and the openings 124, and a like number of right side adjustment slots 128 are formed in the center panel 66 between the openings 124 and right side plate 122. As shown in the Figs., each of the left and right side plates 120, 122 are oriented generally perpendicularly to the center panel 66. A first group of vertically spaced fingers 130, with cut-outs 131 in between adjacent ones, extend outwardly from the left side plate 120. An uppermost finger 130A and a lowermost finger 130B of the first group of fingers 130 are each formed with a bore. A second group of vertically spaced fingers 132, with cut-outs 133 in between, extend outwardly from the right side plate 122. An uppermost finger 132A and a lowermost finger 132B of the second group of fingers 132 are each formed with a bore. Each finger 130, 132 may comprise a plate bended over on itself as best seen in the enlarged portion of FIG. 3. Additionally, in the presently preferred embodiment the vertical height of the center panel 66, e.g. the distance between its top edge 116 and base plate 118, is less than the vertical height of left and right side panels 62, 64. Consequently, the top edge 116 of center panel is spaced from the cross bar 30 leaving an opening 139 which allows the driver of truck 10 to see through the headache rack 60 with his or her rear view mirror.

Figure 3:
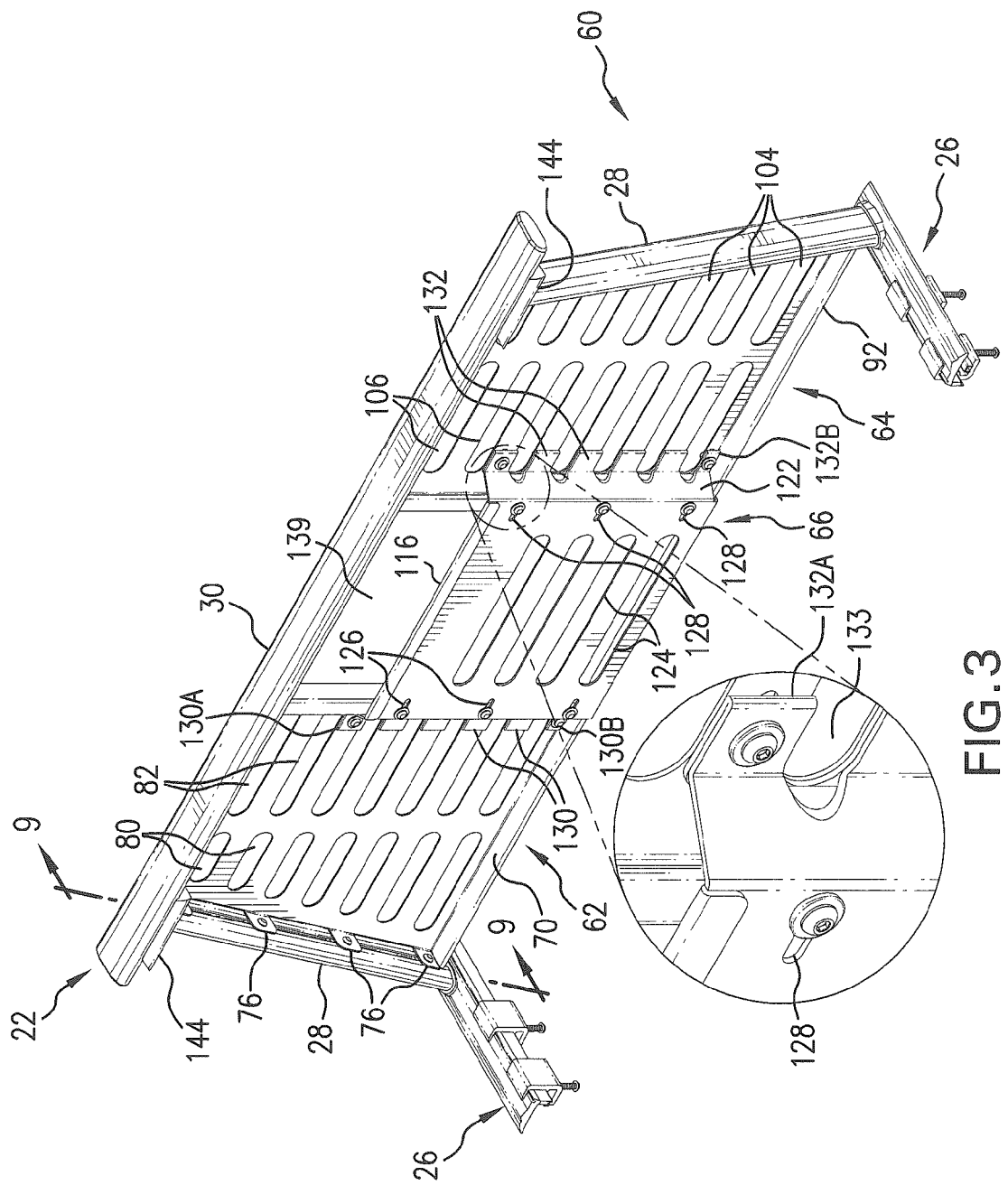
FIG. 3 is a front perspective view of the headache rack of this invention including an enlargement of the connection between the center panel and right-side panel.
Figure 4:
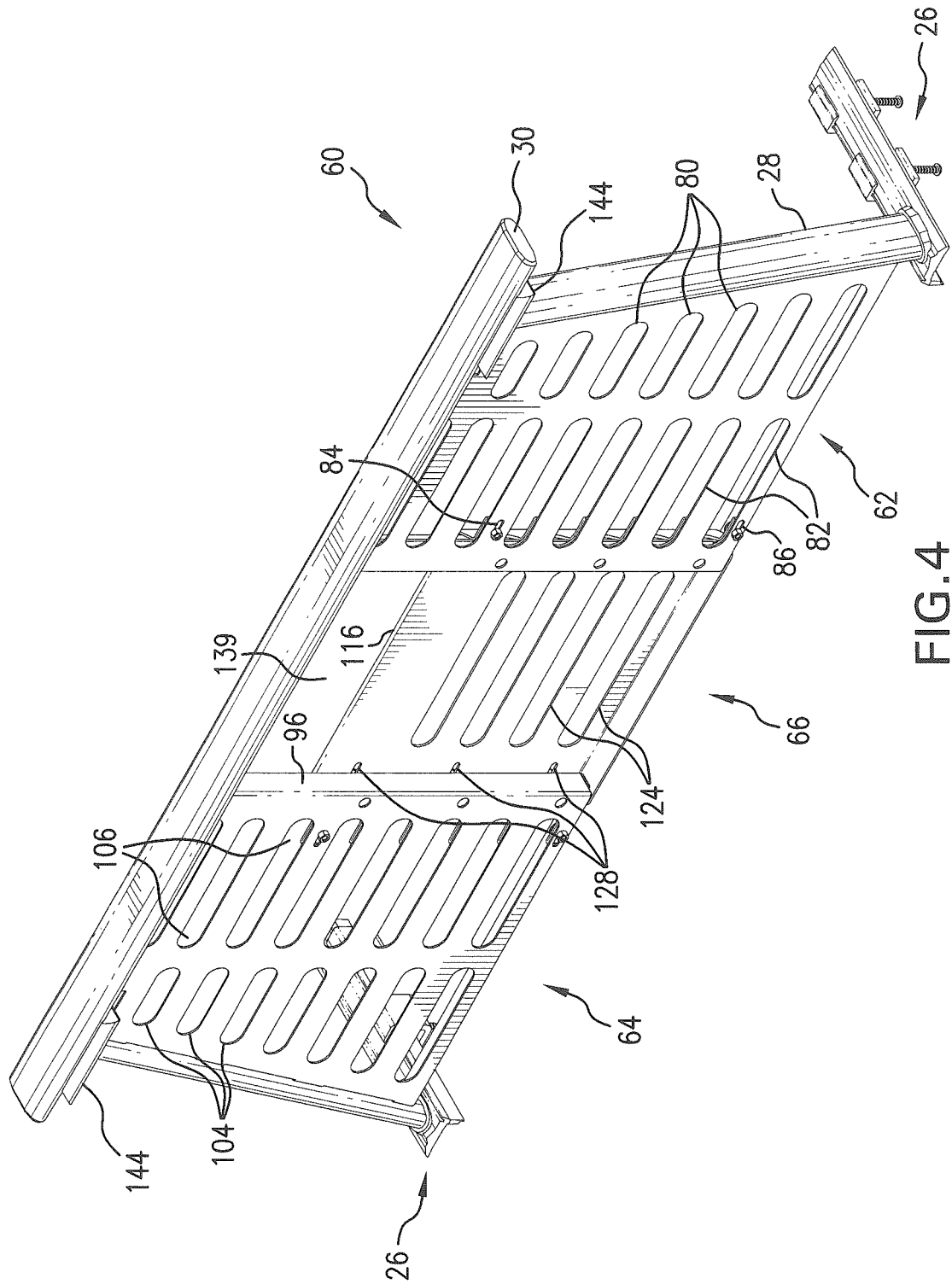
FIG. 4 is a view similar to FIG. 3 except of the back of the headache rack herein.
Figure 9:
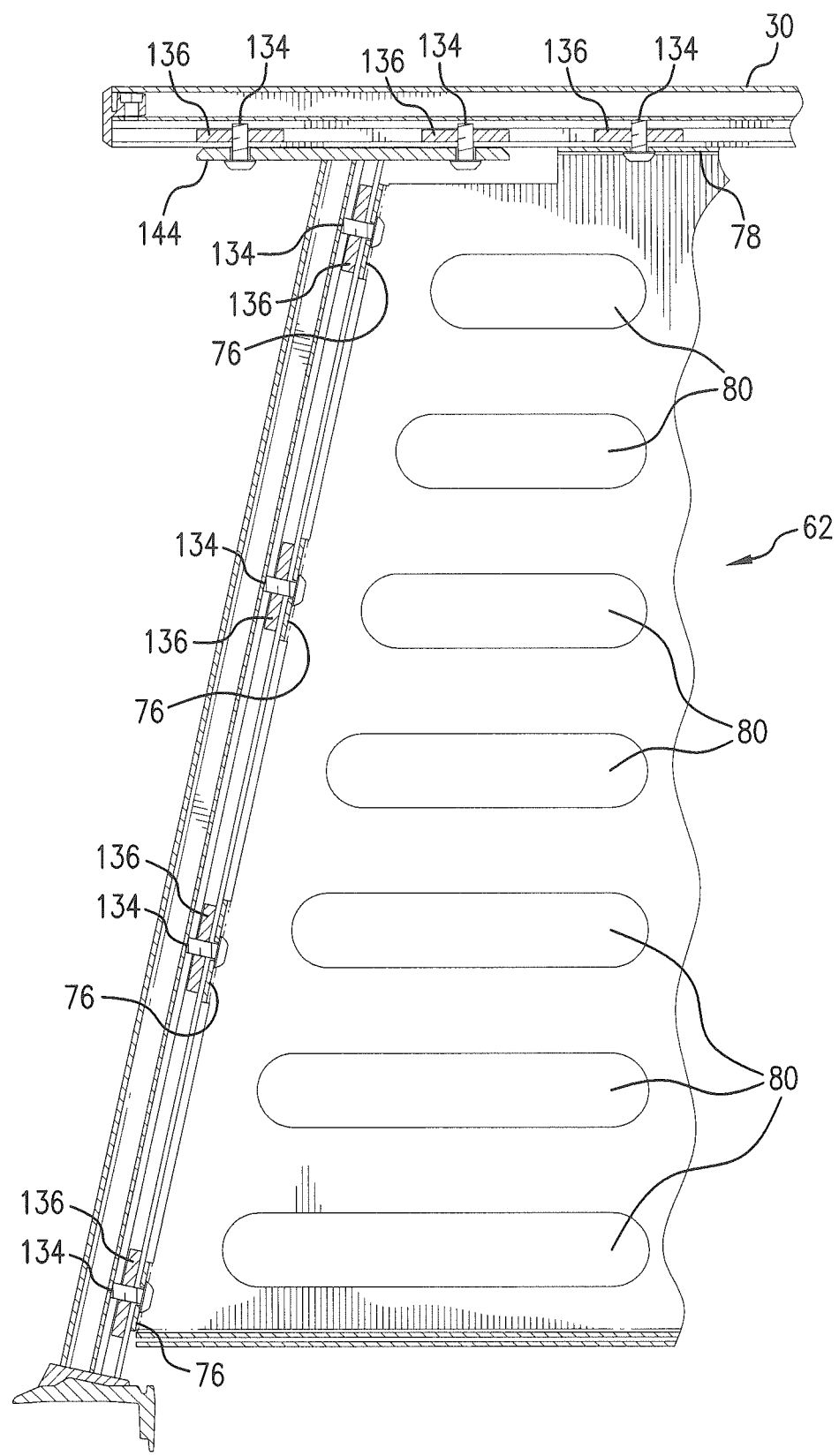
FIG. 9 is a cross sectional view taken generally along line 9-9 of FIG. 3.

The panels 62-66 are mounted to the forward rack structure 22, and to one another, as follows. Referring to FIGS. 3, 5 and 9, the left side panel 62 is mounted to the upright side rail 28 and to the cross bar 30 with fasteners 134, preferably in the form of threaded bolts, which connect to generally rectangular-shaped nuts 136. The two side rails 28 and cross bar 30 each have a hollow interior and are formed with inwardly facing channels 138 and 140, respectively, which extend into such interiors. A fastener 134 is inserted through the hole in each side tab 76 of left side panel 62, and through the hole in each top tab 78, and then a nut 136 is threaded onto the free end of the fasteners 134. In order to secure the left side panel 62 to the side rail 28, its end edge 72 is positioned so that the nut 136 attached to each fastener 134, and a portion of the fastener 134, extend through the channel 138 and into the side rail interior. The rectangular-shaped nuts 136 may then be rotated 90° so that they span the channel 138, after which time the fasteners 134 may be tightened down to secure the left side panel 62 to the side rail 28. The same procedure is employed to mount the left side panel 62 to the cross bar 30, e.g. a fastener 134 is extended through a hole in each top tab 78, connected to a nut 136, the nut 136 and fastener 134 are extended into the interior of the cross bar 30 through its channel 140 and then the fastener 134 tightened down after the nut 136 is rotated 90° to span the channel 140. The right side panel 64 is mounted to side rail 28 located at the side wall 14 of the truck 10, and to the cross bar 30, in the same manner as described above in connection with a discussion of mounting the left side panel 62 to side rail 28 and cross bar 30.

In one presently preferred embodiment, a top plate 144 may be mounted to the upper end of each of the side rails 28 by welding or other permanent means of connection. Each top plate 144 is formed with spaced bores (not shown) which receive a fastener 134 connected to a nut 136. In order to secure the top plates 144 to the cross bar 30, the nuts 136 and a portion of fasteners 134 are extended to the channel 140 of cross bar 30, the nuts 136 are rotated 90° so that they span the channel 140 and then the fasteners are tightened down. See FIG. 9.

As shown in the drawings, the left and right side panels 62, 64 of headache rack 60 are laterally spaced from one another when mounted to the forward rack structure 22 and this spacing may change from one vehicle to another, e.g. the distance between the side walls 12, 14 of a truck bed 18 often varies depending upon the make and model of the truck 10. In order to accommodate such differences in truck bed configuration, the headache rack 60 of this invention features a lateral adjustment capability when mounting the center panel 66 to the left and right side panels 62, 64.

In particular, adjustment structure is provided which may comprise the combination of the adjustment slots 84, 86 and 87 formed in the left side panel 62, the adjustment slots 108, 110 and 112 formed in the right side panel 64 and the adjustment slots 126, 128 formed in the center panel 66 together with fasteners 134 and standard nuts 142. As seen in FIG. 3, for example, with the left and right side panels 62, 64 mounted to the side rails 28 and cross bar 30 as described above, the center panel 66 may be positioned to span the lateral space between such panels 62, 64 with the fingers 130 on the left side plate 120 of the center panel 66 resting against the left side panel 62, the fingers 132 on the right side plate 122 of the center panel 66 resting against the right side panel 64, and, the base plate 118 of the center panel 66 engaging the bottom plates 70, 92 of the left and right side panels 62, 64, respectively. In this position, the fingers 130 on the left side of center panel 66 rest on the spaces between adjacent openings 82 in the left side panel 62 and the cut-outs 131 between fingers 130 align with such openings 82 so as not to block them. The bore in the uppermost finger 130A aligns with the left side panel adjustment slot 84 in left side panel 62, and the bore in the lowermost finger 130B aligns with the left side adjustment slot 86 thereof Similarly, the fingers 132 on the right side of center panel 66 rest on the spaces between adjacent openings 106 in the right side panel 64 and the cut-outs 133 between fingers 132 align with such openings 106. The bore in the uppermost finger 132A aligns with the right side panel adjustment slot 108 in right side panel 64, and the bore in the lowermost finger 132B aligns with the right side adjustment slot 110 thereof Additionally, the left side adjustment slots 126 formed in the center panel 66 align with the bores 88 in the center beam 74 of left side panel 62, and the right side adjustment slots 128 of center panel 66 align with the bores 97 in the center beam 96 of the right side panel 64. Further, bores (not shown) formed in the base plate 118 of center panel 66 align with bottom adjustment slots 87, 112 of left and right side panels 62, 64, respectively.

Figure 7A:
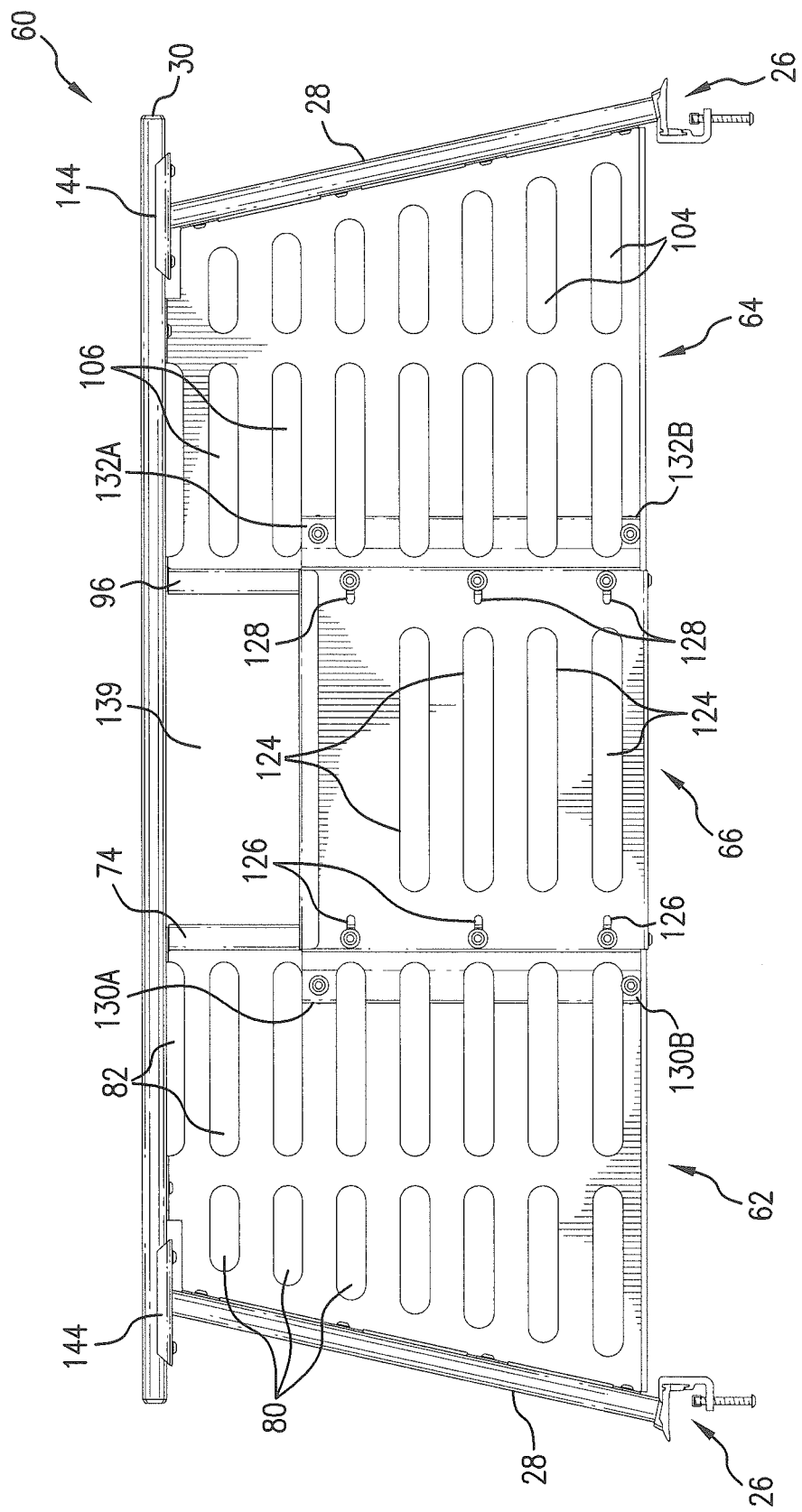
FIG. 7A is a front view of the headache rack illustrating the center panel in an inwardly adjusted position.
Figure 8A:
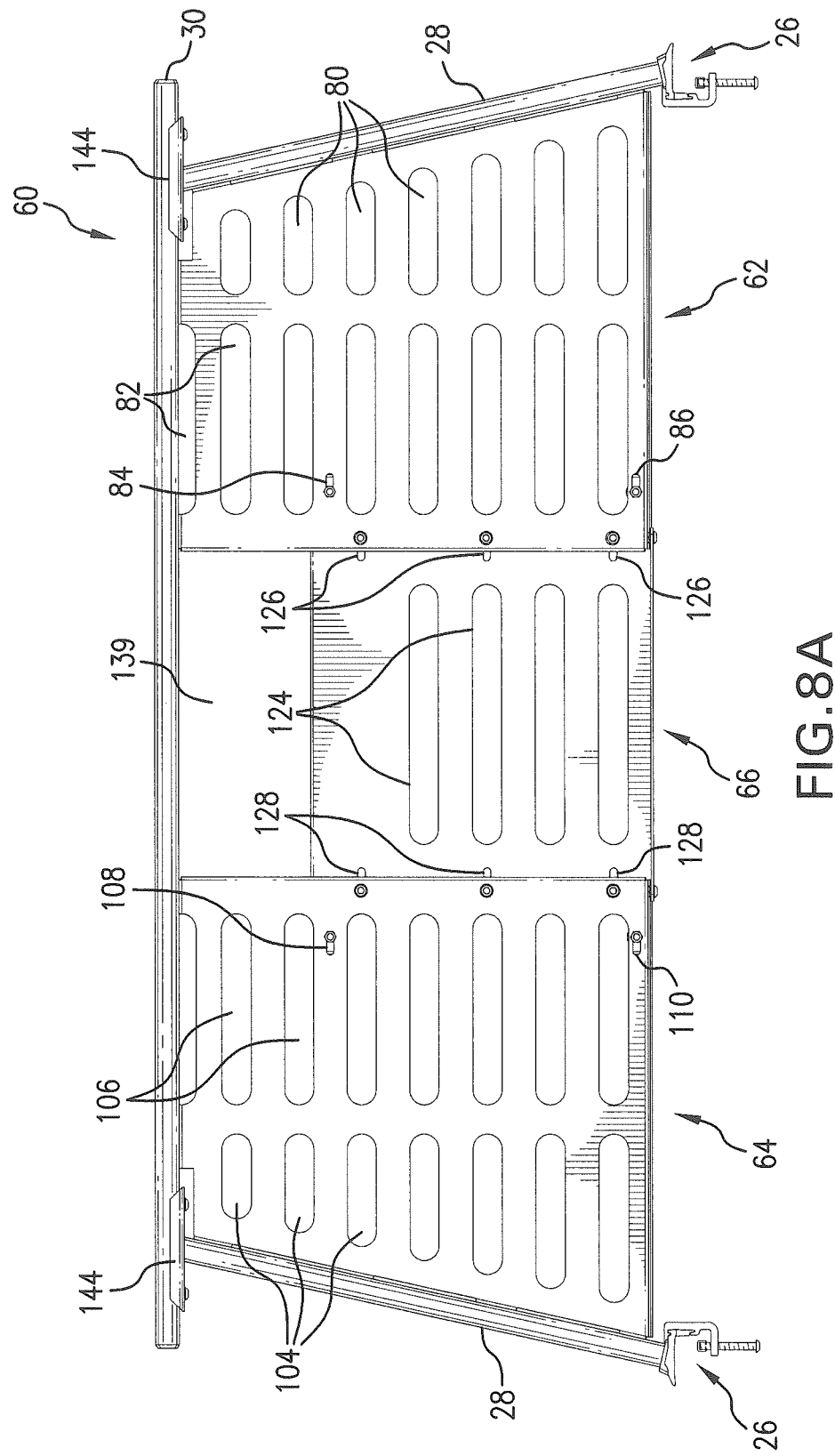
FIG. 8A is a front view of the headache rack illustrating the center panel in an outwardly adjusted position.

As noted above, the center panel 66 is connected to left and right side panels 62, 64 with fasteners 134 and standard nuts 142. A fastener 134 is therefore inserted through each of the aligning slots and bores described above in the panels 62-66 and held in place with a nut 142. See FIG. 6. Lateral adjustment of the center panel 66 relative to the left and right side panels 62, 64 is obtained by moving the fasteners 134 within adjustment slots before tightening them down. FIGS. 7A and 8A illustrate the center panel 66 in a fully inwardly adjusted position to accommodate truck beds 18 of smaller lateral dimension. For purposes of discussion, the terms "inwardly," "innermost," "outwardly" and "outermost" refer to directions relative to the opposed side rails 28, i.e. "outwardly" denotes a direction toward the side rails 28, and "inwardly" means the opposite direction. In the orientation shown in FIGS. 7A and 8A, the fasteners 134 connecting the center panel 66 to respective center beams 74 and 96 of left and right side panels 62, 64 are located at the outermost edge of both the left side adjustment slots 126 and the right side adjustment slots 128 in the center panel 66. The fasteners 134 connecting the uppermost finger 130A and lowermost finger 130B of center panel 66 to the left side panel 62 are located at the outermost edge of the left side panel adjustment slots 84, 86, respectively. The fasteners 134 connecting the uppermost finger 132A and lowermost finger 132B of center panel 66 to the right side panel 64 are located at the outermost edge of respective right side adjustment slots 108, 110. Further, the fastener 134 connecting the base plate 118 of center panel 66 to the bottom plate 70 of left side panel 62 is located at the outermost edge of the bottom adjustment slot 87 in the bottom plate 70, and, the fastener 134 connecting the base plate 118 of center panel 66 to the bottom plate 92 of right side panel 64 is located at the outermost edge of the bottom adjustment slot 112 in the bottom plate 92.

Figure 7B:
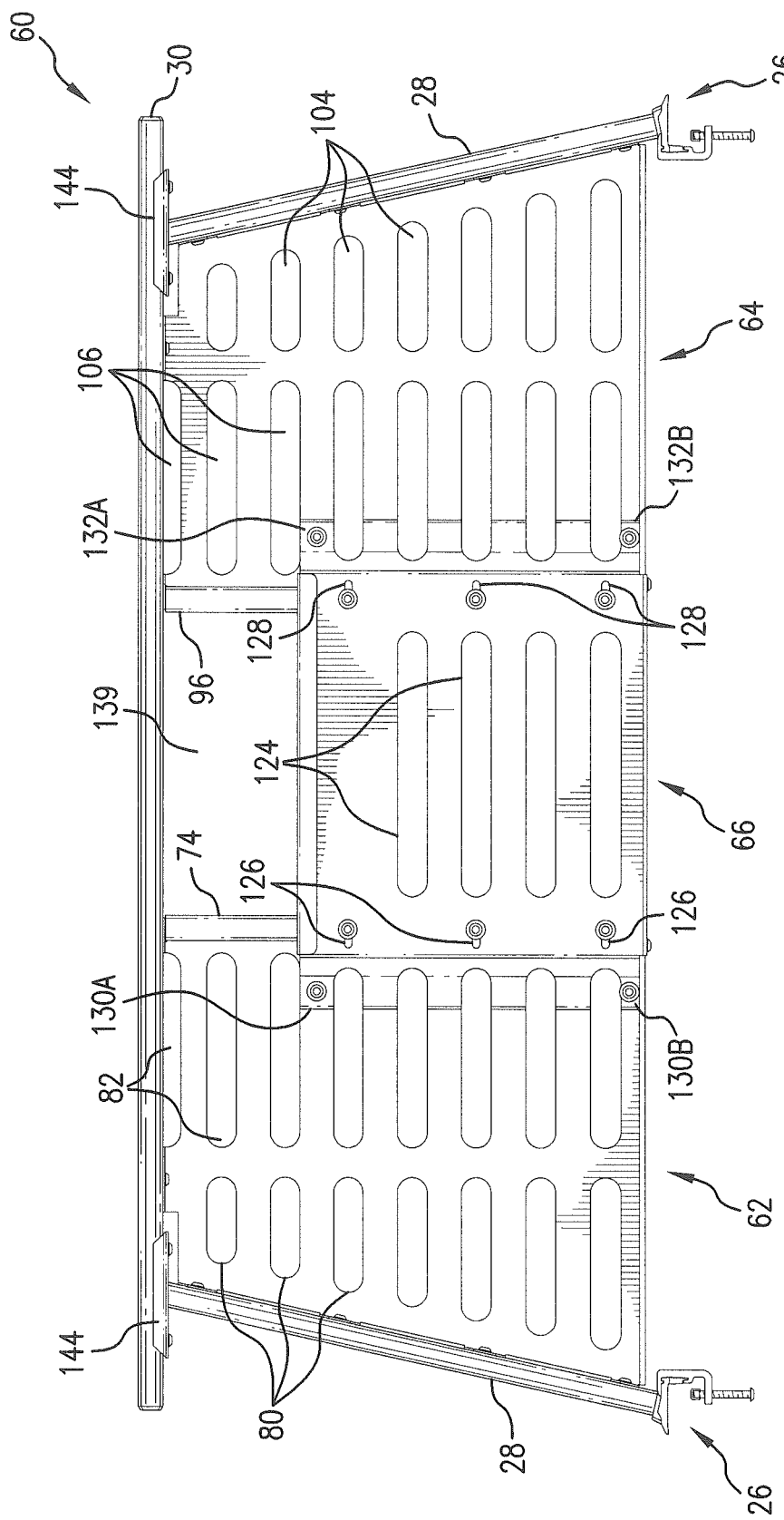
FIG. 7B is a rear view of FIG. 7A.
Figure 8B:
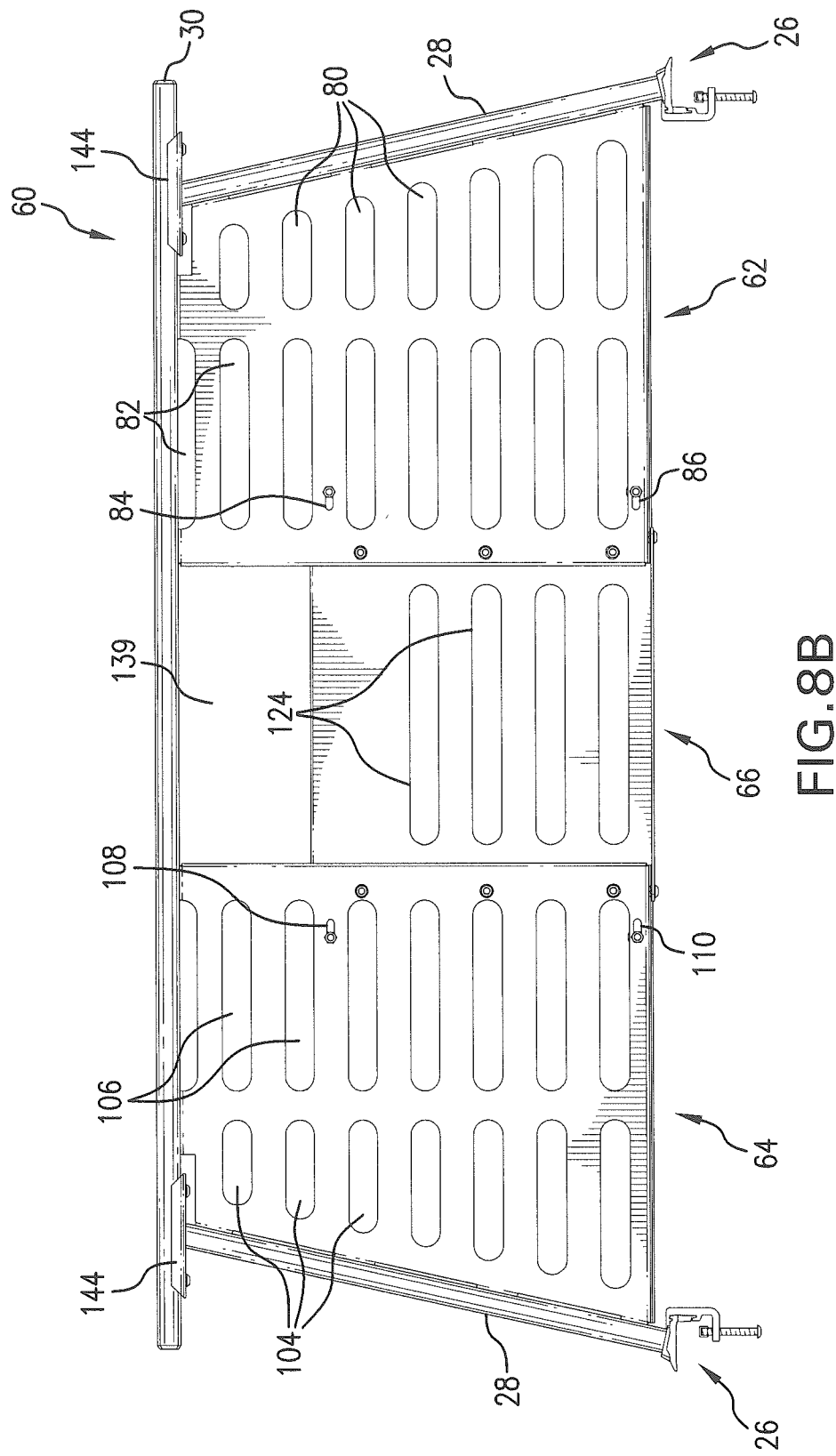
FIG. 8B is a rear view of FIG. 8A.

On the other hand, to accommodate truck beds 18 having a larger lateral dimension, fasteners 134 may be positioned at the innermost edges of the slots discussed above. In particular, as shown in FIGS. 7B and 8B, the fasteners 134 connecting the uppermost finger 130A and lowermost finger 130B of center panel 66 to the left side panel 62 may be located at the innermost edge of the left side panel adjustment slots 84, 86, respectively. The fasteners 134 connecting the uppermost finger 132A and lowermost finger 132B of center panel 66 to the right side panel 64 may be located at the innermost edge of respective right side adjustment slots 108, 110. Further, the fastener 134 connecting the base plate 118 of center panel 66 to the bottom plate 70 of left side panel 62 may be located at the innermost edge of the bottom adjustment slot 87 in the bottom plate 70, and, the fastener 134 connecting the base plate 118 of center panel 66 to the bottom plate 92 of right side panel 64 may be located at the innermost edge of the bottom adjustment slot 112 in the bottom plate 92.

The position of center panel 66 relative to left and right side panels 62, 64 illustrated in FIGS. 7A, 8A and in FIGS. 7B, 8B depict the largest extent of inward and outward adjustment of the lateral width of the headache rack 60 of this invention. It should be understood that the center panel 66 could be positioned anywhere in between the positions shown in FIGS. 7A-8B, as desired, depending on the lateral dimensions of a given truck bed 18.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

For example, the position of the center panel 66 relative to left and right side panels 62, 64 is described above as being laterally adjustable by sliding the center panel 66 along various adjustment slots in the left and right side panels 62, 64, e.g. slots 84, 86, 108, 110, 87 and 112, and along adjustment slots in the center panel 66 itself, e.g. slots 126 and 128. It is contemplated that these slots could be replaced by laterally spaced bores, for example, to provide different lateral positions of adjustment of center panel 66 relative to left and right side panels 62, 64. Additionally, the number, spacing and shape of the openings 80, 82 in left-side panel 62, the openings 104, 106 in right-side panel 64 and the openings 124 in center panel 66 can be varied, as desired.

Therefore, it is intended that the invention not be limited to the particular embodiment disclosed as the best mode contemplated for carrying out this invention, but that the invention will include all embodiments falling within the scope of the appended claims.

What is claimed is:

1. A rack for use with pickup trucks each having opposed first and second side walls and a floor which form a bed, the lateral dimension between the first and second side walls being dependent on the size of the bed of the pickup truck, said rack comprising:
   a first base support capable of being mounted to the first side wall of a first pickup truck and capable of being mounted to the first side wall of a second pickup truck, a second base support capable of being mounted to the second side wall of the first pickup truck and capable of being mounted to the second side wall of the second pickup truck, the first pickup truck having a different lateral dimension between its first and second side walls than the second pickup truck, said first and second base supports being laterally spaced from one another when mounted to respective first and second side walls, said lateral spacing between said first and second base supports being different when mounted to respective first and second side walls of the first pickup truck than when mounted to respective first and second sidewalls of the second pickup truck;
   a cross bar;
   a first side rail mounted to said first base support and to said cross bar, a second side rail mounted to said second base support and to said cross bar;
   a first side panel mounted to said first side rail and to said cross bar, a second side panel mounted to said second side rail and to said cross bar, said first and second side panels being positioned at different lateral spacings from one another dependent on said lateral spacing between said first and second base supports;
   a center panel;
   said center panel and said first side panel having first adjustment structure which is capable of connecting said center panel to said first side panel at different lateral spacings between said first and second side panels;
   said center panel and said second side panel having second adjustment structure which is capable of connecting said center panel to said first side panel at said different lateral spacings between said first and second side panels.

2. The rack of claim 1 in which said first side panel includes a top edge, a side plate, a center beam having at least one bore, and a bottom plate, at least one side tab being mounted to said first side panel along said side plate and at least one top tab being mounted to said first side panel along said top edge, said first side panel being formed with at least one first adjustment slot and said bottom plate being formed with at least one bottom adjustment slot.

3. The rack of claim 2 in which said first side rail and said cross bar are each formed with an elongated channel, said first side panel being connected to said first side rail by a fastener extending through said at least one side tab and into said elongated channel of said first side rail, said first side panel being connected to said cross bar by a fastener extending through said at least one top tab and into said elongated channel of said cross bar.

4. The rack of claim 3 in which said second side panel includes a top edge, a side edge, a center beam having at least one bore, and a bottom plate, at least one side tab being mounted to said second side panel along said side edge and at least one top tab being mounted to said second side panel along said top edge, said second side panel being formed with at least one second adjustment slot and said bottom plate being formed with a bottom adjustment slot.

5. The rack of claim 4 in which said second side rail is formed with an elongated channel, said second side panel being connected to said second side rail by a fastener extending through said at least one side tab and into said elongated channel of said first side rail, said second side panel being connected to said cross bar by a fastener extending through said at least one top tab and into said elongated channel of said cross bar.

6. The rack of claim 5 in which said center panel is formed with at least one first finger extending outwardly from a first side thereof and at least one second finger extending outwardly from a second side thereof, said at least one first finger being connected to said first side panel by a fastener extending into said at least one first adjustment slot thereof, said at least one second finger being connected by a fastener to said second side panel by a fastener extending into said at least one second adjustment slot thereof.

7. The rack of claim 6 in which said center panel is formed with at least one first center panel adjustment slot along said first side thereof and at least one second center panel adjustment slot along said second side thereof, said center panel being connected to said first side panel by a fastener extending between said at least one first center panel adjustment slot and said at least one bore in said center beam of said first side panel, said center panel being connected to said second side panel by a fastener extending between said at least one second center panel adjustment slot and said at least one bore in said center beam of said second side panel.

8. The rack of claim 7 in which said center panel is formed with a base plate, one fastener extending between said base plate of said center panel and said bottom adjustment slot in said bottom plate of said first side panel and another fastener extending between said base plate of said center panel and said bottom adjustment slot in said bottom plate of said second side panel.

9. The rack of claim 8 in which said first adjustment structure includes said at least one first finger of said center panel and said at least one first adjustment slot of said first side panel, and said second adjustment structure includes at least one second finger of said center panel and said at least one second adjustment slot of said second side panel.

10. The rack of claim 9 in which said first adjustment structure includes said at least one first center panel adjustment slot in said center panel and said at least one bore in said center beam of said first side panel, and said second adjustment structure includes at least one second center panel adjustment slot in said center panel and said at least one bore in said center beam of said second side panel.

11. The rack of claim 9 in which each of said first and second side panels is formed with a number of spaced openings in proximity to said center beams thereof, said at least one first finger of said center panel comprising a number of spaced first fingers with a first cut-out in between adjacent first fingers, said at least one second finger of said center panel comprising a number of spaced second fingers with a second cut-out in between adjacent second fingers, said spaced first fingers which extend outwardly from said first side of said center panel being positioned in between adjacent openings in said first side panel and said first cut-outs aligning with said adjacent openings thereof, said spaced second fingers which extend outwardly from said second side of said center panel being positioned between adjacent opening in said second side panel and said second cut-outs aligning with said adjacent openings thereof.

12. The rack of claim 10 in which said first and second adjustment structure includes said base plate of said center panel and said bottom adjustment slots formed in said bottom plate of respective first and second side panels.

13. The rack of claim 1 in which said center panel is formed with a number of spaced openings.

14. The rack of claim 1 in which said center panel has a top edge, said top edge being spaced from said cross bar when said center panel is mounted to said first and second side panels.

* * * * *